(12) United States Patent
Rosenbaum

(10) Patent No.: US 11,407,410 B2
(45) Date of Patent: Aug. 9, 2022

(54) METHOD AND SYSTEM FOR ESTIMATING AN ACCIDENT RISK OF AN AUTONOMOUS VEHICLE

(71) Applicant: Walter Steven Rosenbaum, Jerusalem (IL)

(72) Inventor: Walter Steven Rosenbaum, Jerusalem (IL)

( * ) Notice: Subject to any disclaimer, the term of this patent is extended or adjusted under 35 U.S.C. 154(b) by 169 days.

(21) Appl. No.: 16/380,049

(22) Filed: Apr. 10, 2019

(65) Prior Publication Data

US 2019/0308619 A1 Oct. 10, 2019

Related U.S. Application Data

(60) Provisional application No. 62/658,277, filed on Apr. 16, 2018.

(30) Foreign Application Priority Data

Apr. 10, 2018 (EP) ..................................... 18020139

(51) Int. Cl.
*B60W 30/095* (2012.01)
*B60W 40/09* (2012.01)
*G05D 1/00* (2006.01)

(52) U.S. Cl.
CPC ........ *B60W 30/0953* (2013.01); *B60W 40/09* (2013.01); *G05D 1/0088* (2013.01); *G05D 2201/0213* (2013.01)

(58) Field of Classification Search
CPC .............. B60W 30/0953; B60W 40/09; G05D 2201/0213; G05D 1/0088
See application file for complete search history.

(56) References Cited

U.S. PATENT DOCUMENTS

| 7,725,226 B2* | 5/2010 | Urababa | B60G 17/0162 |
| | | | 701/38 |
| 10,720,080 B1* | 7/2020 | Fields | G07C 5/085 |
| 2016/0055236 A1* | 2/2016 | Frank | G06Q 30/02 |
| | | | 707/748 |
| 2016/0231746 A1* | 8/2016 | Hazelton | G01S 13/867 |
| 2017/0234689 A1* | 8/2017 | Gibson | G01C 21/3492 |
| | | | 701/25 |
| 2017/0372431 A1* | 12/2017 | Perl | G07C 5/085 |

(Continued)

FOREIGN PATENT DOCUMENTS

WO  2018002892 A1  1/2018

*Primary Examiner* — Rachid Bendidi

(74) *Attorney, Agent, or Firm* — Laurence A. Greenberg; Werner H. Sterner; Ralph E. Locher

(57) ABSTRACT

A method for estimating an accident risk of an autonomous driving unit produces helpful results with fewer autonomous driving cycles. From driving values, which have been determined from monitoring at least one driving parameter of the driving unit during autonomous driving, an autonomous-driving quantity is determined quantifying an autonomous-driving quality of the driving of the driving unit. The autonomous-driving quantity is associated with a plurality of manual-driving quantities, which have been determined from the same driving parameter during manual driving periods of different driving units. An autonomous-driving accident rate value is determined from accident rate values associated to those manual-driving quantities.

21 Claims, 2 Drawing Sheets

(56) References Cited

U.S. PATENT DOCUMENTS

| | | |
|---|---|---|
| 2018/0061253 A1 | 3/2018 | Hyun |
| 2018/0074501 A1* | 3/2018 | Boniske .............. G05D 1/0257 |
| 2018/0099669 A1* | 4/2018 | Gordon ............. B60W 30/0956 |
| 2018/0101172 A1* | 4/2018 | Min ..................... G05D 1/0287 |
| 2018/0194336 A1* | 7/2018 | Lewandowski ........... B60T 7/22 |
| 2019/0158581 A1 | 5/2019 | Gianella et al. |

* cited by examiner

| Serial number of Driving history folder | Respective Driving Quality Metric Distribution | | Metric Value | Accident Value |
|---|---|---|---|---|
| # 1234 | Speed | ⌒ | -2,1 km/h | 97.235 km |
|  | Acceleration | ⌒ | 2,5 km/h |  |
|  | Deceleration | ⌒ | 5,6 |  |
|  | Erratic Driving | ⌒ | 35 s |  |

METHOD AND SYSTEM FOR ESTIMATING AN ACCIDENT RISK OF AN AUTONOMOUS VEHICLE

CROSS-REFERENCE TO RELATED APPLICATION

This application claims the priority, under 35 U.S.C. § 119, of European patent application EP 18020139, filed Apr. 10, 2018 and further claims the benefit, under 35 U.S.C. § 119(e), of provisional patent application No. 62/658,277 filed Apr. 16, 2018; the prior applications are herewith incorporated by reference in their entirety.

BACKGROUND OF THE INVENTION

Field of the Invention

Autonomous driving on public roads has progressed into a real part of the future automotive landscape. Reflective of its still evolving status and capability autonomous driving is categorized currently into at least five incremental levels of capability, from level 1 where the human driver must be ready to take over any time, to level 5 describing complete robotic driving all the time, while humans are just along for the ride and to tell the car where to go.

Autonomous driving requires extremely capable software not only for driving the car but for recognizing the surrounding objects and for correct prediction of their potential behavior with regard to the current driving situation of the autonomously driven car. Such recognition and prediction is extremely complex since all numbers and kinds of objects, situations and possibilities of behavior is hardly manageable. Any combination of objects, situations and possibilities of behavior, which is not correctly interpreted by the artificial intelligence software, may lead to an accident of the car resulting in damage to persons, costs and loss of confidence in the car and its safe driving abilities.

Due to the complexity of possible driving situations, the artificial intelligence software and its reactions with the car needs extremely elaborate testing. Such testing is done in millions of kilometers of test driving with completely or partly autonomous driving modes. But even with enormous testing effort vehicle engineers can never be sure that the artificial intelligence software really is sophisticated and capable of handling all kind of driving situations correctly or at least is not a regression. Moreover, the engineering of artificial intelligence software is extremely time consuming, since, if in long test driving cycles the software proves to be insufficient with specific details, the enhanced software needs to go back into exhaustive testing, again taking a lot of time.

SUMMARY OF THE INVENTION

It is, therefore, an object of the present invention to provide a method for estimating an accident risk of an autonomous vehicle, which produces helpful results with fewer autonomous driving cycles.

With the foregoing and other objects in view there is provided, in accordance with the invention, a computer-implemented method for estimating an accident risk of an autonomous driving unit, the method comprising:

monitoring at least one driving parameter of the driving unit during autonomous driving and determining driving values;

determining an autonomous-driving quantity which quantifies an autonomous-driving quality of the driving of the driving unit;

associating the autonomous-driving quantity with a plurality of manual-driving quantities, which have been determined from the at least one driving parameter during manual driving periods of different driving units; and determining an autonomous-driving accident rate value from accident rate values associated with the manual-driving quantities.

The objects of the invention are solved by a method for estimating an accident risk of an autonomous vehicle, wherein from driving values, which have been determined from monitoring at least one driving parameter of the driving unit during autonomous driving, an autonomous-driving quantity is determined quantifying an autonomous-driving quality of the driving of the driving unit, the autonomous-driving quantity is associated to a plurality of manual-driving quantities, which have been determined from the same driving parameter during manual driving periods of different driving units, and from accident rate values associated to those manual-driving quantities an autonomous driving accident rate value is determined.

With the autonomous-driving accident rate value a weak point of an autonomous-driving control software can be detected and the software can be enhanced to reduce the autonomous-driving accident risk. The software update can be installed to a control unit of the driving unit, and the driving unit will then be controlled by the enhanced software. By this measure the autonomous-driving control software can be enhanced without the need of the occurrence of real autonomous-driving accidents and their evaluation.

The invention involves the idea that a manual driver is, in many cases, exposed to the same driving dangers as an artificial intelligence software controlling the autonomous driving of the vehicle. Thus, the reactions necessary to prevent an accident in a dangerous situation will be essentially the same or similar for the artificial intelligence than for the manual driver. The more difficult such reactions are for the manual driver, the more difficult it will be, in most cases, for vehicle engineers to program the artificial intelligence software correctly to perform such reactions. Thus, the challenges for the artificial intelligence are similar to those of the manual driver.

Dangerous driving situations often cause a driver, manual or artificial intelligence, to react with specific driving patterns such as strong deceleration combined with significant and fast steering movements. Such patterns can easily be backtraced by monitoring a driving characteristic parameter, like speed and/or acceleration—positive or negative—in driving direction or sideward acceleration. On the other hand, anticipatory driving will avoid near accident situations in most cases. If, thus, an autonomous driving pattern is similar to manual driving patterns which are associated to a high accident rate, this is a strong indication that the artificial intelligence software is only insufficiently capable to handle such accident-prone situations, even if no accident occurs.

A further aspect is that the artificial intelligence software can thus be rated with regard to its statistical driving safety property. The rating score is a useful measure not only for software improvement or redesign, but it may be a useful rating score for calculating an insurance risk for an insurance company insuring vehicles which make use of this artificial intelligence software. The rating score or the insurance risk is a fine indicator for usage based product liability for autonomous vehicle insurances.

A driving pattern characteristic for a specific driving style can be illustrated by driving quantity which driving quantity reflects different degrees of specific driving. During manual driving periods an accident risk, preferably reflected by an accident rate value, can be associated to each driving quantity, be it as a value to value relation or as a function reflecting the relation between driving quantities and accident rate value. The accident rate values can be accident rates per distance, like X accidents per Y kilometers of vehicle driving. Further, the accident rates can be broken down in accident severity degrees, like human damage values or machine damage values, reflecting that heavy accidents result in a higher accident value than only slight accidents. Accordingly, one heavy accident per distance causes a higher accident rate value than one minor accident per the same distance.

As a result, an autonomous driving accident rate value can be determined from the accident rate values associated to those manual-driving quantities which reflect similar driving patterns and have, thus, a certain degree of similarity with the autonomous-driving quantity.

Summarizing, to support testing of artificial intelligence software for controlling autonomous driving of vehicle, it is advantageous to test the artificial intelligence versus manual driving databases, resulting in an accident risk or accident rate of the driving of the vehicle controlled by the artificial intelligence. By this, the statistical accident rate and thus the degree of safety of the software can be determined easily only by relatively few autonomous-driving testing journeys, i.e. in a short period of time. If the corresponding driving quantities compiled from said autonomous driving relate to low safety manual driving quantities, than it is inferred that safety is correspondingly poor or deficient and corresponding flaws can be sought in the artificial intelligence logic without having to draw the same conclusion from actual accident events. Analogously, the same inference—if the accident rate mileage is low or has decreased—can be used to assess the efficacy of updates made to operational—on the road—autonomous vehicles artificial intelligence (AI) control logic to make sure that error fixes or enhancements transmitted to operating vehicles are achieving their intended result. Hence, in both autonomous vehicle AI evaluation setting and analogous extensions as usage based product liability insurance rate setting, the subject AI software can be continuously assessed and evaluated in terms of driving safety, i.e. accident rate or probability without the need of real accidents occurring with the use of the software.

An autonomous vehicle in the sense of the invention can be a vehicle with software for controlling the driving of the vehicle completely, as in level 5, or only partly, levels 1 to 4. A driving parameter can be the speed of the vehicle, an acceleration of the vehicle, either positive or negative, in driving direction, or sideward, a combination of speed and acceleration and/or a combination of different accelerations, like in a predefined time span, a steering wheel turning parameter, like a turning angle, turning rate per time, subsequent turning angles in different directions, a pedal activation parameter, like pressing force, pressing velocity, or the like.

A driving quantity can be a one-dimensional quantity, like a single value, or a multi-dimensional quantity, like a vector with a multitude of values, which quantifies a driving quality of the driving of a driving unit. A driving quality may be quantified by a comparison of values of a driving parameter, like speed, acceleration or turning of the steering wheel, with a geostationary parameter value, like a speed limit or a parameter value of other driving units at the same location.

If a driving unit, like a car or other vehicle, drives faster than a speed limit or a prevailing driving speed of surrounding vehicles, the resulting value, like the speed difference or another value derived from the comparison, is an indicator of the driving quality. Generally, the faster the driving, the higher the resulting value, the worse is the driving, and the other way around.

In general:

Values of a driving parameter, such as speed, acceleration or turning of the steering wheel, or the like, may be determined during the driving of a driving unit. These values are called driving value.

Each driving value may be compared to a geostationary value of the same parameter, like a speed limit, a prevailing speed, or another parameter value of other driving units at the same location, the comparison result is a resulting value. Alternatively, a plurality of driving values may be combined to a resulting value.

A plurality of such resulting values may be consolidated to a driving quality value, which can be the mean, median or other mathematical resume of the resulting values. For example, the resulting values determined from driving during a driving period are consolidated to a driving quality value.

A driving quality value may be used as a driving quantity. Or a plurality of driving quality values collected during a superior driving period are consolidated to a driving quantity, which can be the mean, median or other mathematical resume of the driving quality values. The superior driving period may allow to characterize the driving of the driving unit in general, like at least over one year, or at least over 10.000 km collected driving distance.

A driving quantity preferably is assembled from only one kind of driving value, each driving value of the same kind being generated in the same way.

Preferably, the driving quantity is a driving quality metric. A driving quality metric can be a driving quantity which is determined for a plurality of driving units in the same way, so that the quantities are comparable and rankable, preferably for at least 1.000 driving units. A superior driving period of a metric is called metric period in the following.

A driving period can be a single or a plurality of journeys of a driving unit, or all journeys of a driving unit during a predetermined time span, such as ten days, a month or a quarter of a year.

The driving quantity can be a manual-driving quantity or an autonomous-driving quantity. A manual-driving quantity is determined from manual driving values detected during manual driving, and an autonomous-driving quantity is determined from autonomous-driving values detected during autonomous driving.

According to the invention, the autonomous-driving quantity is associated to some of those manual-driving quantities, which have been determined from the same driving parameter during manual driving periods. The manual-driving quantities originate from different driving units, which may be different or at least partly the same vehicle which caused the autonomous-driving quantities. However, to achieve a broad data basis, it is favorable that the manual-driving quantities each result from one separate vehicle, and thus many manual-driving quantities in total result from driving of a plurality of vehicles.

It could be useful, however, to restrict the pool of driving units from which the manual-driving quantities are generated for assignment. Such restriction parameter can be the functionality of the vehicles. If, for example, the association data are compiled from improperly functioning vehicles this could influence the statistics in an unfavorable manner. It is advantageous, therefore, to restrict the pool of vehicles, which are used for generating the manual driving quality database, by vehicle age or a predetermined time period of having passed vehicle inspection. Another restriction parameter could be the same vehicle manufacturer or the same vehicle model. Even driver properties may be used as restriction parameter, such as the driver's age and/or the age of the driver license of the driver.

In a preferred embodiment of the invention, the manual-driving quantities are derived in the same way as the autonomous-driving quantity. I.e. they are derived from the same kind of driving values which have been determined from the same driving parameter.

A driving unit can be a driver, a vehicle, or a combination of a driver and a vehicle. Preferably, a driving unit is a combination of one specific driver in one specific vehicle. If the driver drives in another vehicle, he and his vehicle may be seen as separate driving unit. If a driving unit is a combination of a specific driver with a specific vehicle, the driver of the autonomous driving unit can be an artificial intelligence driving software of the autonomous driving unit, and the drivers of the different manual driving units can be humans.

Preferably, for a plurality of driving units driving values are generated from manual driving over a predefined period. The driving period can be a superior driving period, like a sustain period, which preferably lasts for at least one year. For each driving unit a manual-driving quantity can be determined from the driving values gathered over the whole period.

To each manual-driving quantity at least one accident rate value can be associated. The accident rate values can be a heuristically determined value, like a driving accident rate, i.e. a number of driving kilometers per accident event. Then, from the accident rate values associated to those manual-driving quantities—which preferably are similar to the autonomous-driving quality metrics—an autonomous-driving accident rate value is determined. The autonomous-driving accident rate value can be a driving accident rate, i.e. a number of driving kilometers per accident event, like the mean or median of the plurality of accident rate values associated to those manual-driving quantities. Preferably, the median of the accident rate values associated to those similar manual-driving quantities is set as autonomous driving accident rate value. The use of the median isolates the computation of accident rate from unusual or outlying events.

Driving quantities may be determined in different categories, each category using a different kind of driving values. In general, from one or more driving parameters being monitored during manual driving of the different driving units a plurality of manual-driving quantities of different categories can be determined. Preferably, only those manual-driving quantities are chosen for association with the autonomous-driving quantity which belong to the same category as the autonomous-driving quantity.

To distinguish between different driving areas in which the driving risk may differ due to area characteristics, it is advantageous, if the categories are a plurality of different locale categories where the driving parameter was monitored. The locale categories can be urban, rural and highway, or other specific driving surroundings.

As outlined above, a plurality of different categories of driving quantities can be generated during a driving period of one vehicle. The categories can be differentiated in kinds, like speed and acceleration events, for example. Further, the categories can be differentiated into different locales where the driving values were gathered. Kinds and locales may be independent from one another. This is true for autonomous and manual driving quantities. Accordingly, during one time period, more than one autonomous-driving quantity can be generated. And each such quantity can be associated to a plurality of manual quantities, preferably of the same kind and locale. In other words: Preferably, a plurality of quantities are determined for different categories of autonomous-driving quantities, and each autonomous quantity is associated with a plurality of manual-driving quantities which have been determined from the same driving parameter, and for each category of quantity an autonomous-driving accident rate value is determined.

To access the driving risk of autonomous driving, an autonomous-driving quantity is associated to a plurality of manual-driving quantities. This step is based on the idea that autonomous driving and manual driving may share the same weaknesses in special driving situations. However, not all driving data are suitable for finding the driving risk of autonomous driving. Therefore, from the available autonomous or manual quantities a selection may be made.

Accordingly, only those manual-driving quantities may be selected for association with the autonomous-driving quantity which have a bad driving rating value below a predefined threshold compared with a group of manual-driving quantities.

On the other hand, the autonomous-driving quantity may be associated to the manual-driving quantities only if the autonomous-driving quantity has a bad driving rating value below a predefined threshold compared with a group of other autonomous-driving quantities.

Mostly, artificial intelligence software will control a driving of a vehicle very well with regard to a specific parameter, like a statutory speed limit, for example. I.e. autonomously driven vehicles will not be speeding very often. A speed quantity will thus be indicating very safe driving, in most cases. Such value is not very meaningful with regard to the quality and safety of the artificial intelligence software. This may be completely different with deceleration quantities, for example. It is useful, therefore, to weight the different quantities differently, probably according to heuristic values or functions.

A very simple way of "weighting" is achieved, if an overall autonomous driving accident rate value is determined from only one kind of quantity, like deceleration quantity. In a more sophisticated way, an overall autonomous driving accident rate value can be determined from only those of the accident rate values, which have an accident rate value with a predefined character. The predefined character can be an accident rate value above a predefined value, or a predefined percentage of the values with have the highest accident risk, or the like. By this, the focus of the evaluation lies on the flaws of the artificial intelligence software.

In detail, a manual or autonomous driving quantity can be compared with other driving quantities, preferably of the same kind and locale. A suitable rating parameter is the quantity as such. This rating of a quantity against a plurality of quantities contained in a database may result in a rating value, like 43%, which means, that 57% of all metric values of the database show a statistically better driving and 43% show a worse driving. Now, the rating value can be used for the weighting of the quantities. One possible way is to use only those manual quantities whose rating value is above a predefined threshold, like 90%. This low rating value indicates dangerous driving, reducing the focus of the manual quality metrics to the dangerous spectrum of driving.

Another way of weighting is the use of the locale of the manual driving quantity. Usually, driving on rural roads is more dangerous as driving on an expressway, and driving in a downtown traffic is more dangerous than driving on a well-built and wide rural road. In other words: A driving risk strongly depends on the location where the driving occurs, or more general: the area category. It is advantageous, therefore, if the driving quantity is categorized into multiple different area categories where the driving event—from which the value was calculated—occurred. Then only those manual-driving quantities may be chosen for assignment, which are categorized into the same area category in with the autonomous-driving quantity is categorized. This measure helps to categorize driving patterns, and helps to prevent an assignment of patterns which are similar at a first sight, but lead to wrong accident risks.

In a further embodiment of the invention, only those manual-driving quality quantities are chosen for association to the autonomous-driving quantity, which show a predetermined degree of similarity with the autonomous-driving quantity, the other manual-driving quantities being omitted for such assignment. Such predetermined degree of similarity may be a value difference of the autonomous-driving quantity to the manual-driving quantities below a predefined statistical or other threshold. The value similarity gives a first indication, that the driving abilities of the manual driver and the autonomous driver are similar with respect to the monitored driving characteristic parameter. In general: The artificial intelligence software controlling the vehicle during driving can be seen as further driver whose driving abilities are compared with the driving abilities of one or more human drivers. If both kinds of drivers show the same driving pattern, the chance is sufficient that they have a comparable driving accident risk, or more specific: the same driving imperfections, which after their detection should be fixed with regard to the autonomous driving software.

The assignment of the manual to the autonomous driving quantity can be done by two ways, both ways be performed alone or in combination. In a first way, the quantities are compared as such, and preferably only those manual-driving quantities are selected for deriving the autonomous driving accident risk whose value is predefined close to the autonomous-driving quantity. In a second way, the manual quantities are compared with the autonomous quantity by way of statistical similarity. If a manual quantity shows a predetermined degree of statistical similarity with the autonomous-driving quality metric, it is chosen for deriving the autonomous driving accident risk. The statistical similarity of the quantities can be the statistical similarity of the driving resulting values or driving quality values from which the driving quantities have been determined. All those manual quantities, which do not have the predetermined degree of statistical similarity with the autonomous-driving quantities, are discarded, and the autonomous driving accident risk is derived without those non-similar quantities. The predetermined degree of statistical similarity can be tested by Null-Hypothesis testing or Gauss testing. Such tests are simple tests for verification of statistical similarity of two distributions, preferably normal distributions.

The first way may be performed as a pre-step to save computation time in the statistical step. However, a similar result can be achieved by terminating the statistical testing after a series on n tests (like n=3) that fail on either the + or − direction with respect of the value comparison. If performed in a two-step method, this contributes that the autonomous driving accident risk is derived only from those manually driven journeys, which show a similar driving pattern to the autonomous quantity.

In a further embodiment of the invention, the autonomous-driving quantity and the manual-driving quantities are determined as follows. They can be called "speed quantity" or "speed metric".

During the operation of the vehicle the driving speed of the vehicle is determined a plurality of times, like regularly or at random instants of time. The driving speed is thus the monitored driving parameter.

The location of the vehicle is determined for those time points where the speed is or was determined.

Each vehicle speed value is compared with a speed value associated to the respective locations. Such associated speed value can be the statutory speed or prevailing speed at those locations at the time point at which the vehicle drove there.

Then a speed difference between the driving speed value and the associated speed value is determined. This speed difference can be seen as a resulting value.

From a plurality of such resulting values a speed quantity is determined, like by averaging the resulting values or by the mean of those resulting values. A speed difference is a resulting value, wherein from a plurality of such resulting values determined during a driving period, like a journey, a driving quality value is determined, like averaged. And then from a plurality of such driving quality values, like of a month or three months, a driving quantity or driving quality metric is determined.

In another embodiment of the invention, the autonomous-driving quantity and the manual-driving quantities are determined as follows. They can be called "acceleration quantity" or "acceleration metric value".

During the operation of the vehicle a positive acceleration of the vehicle, i.e. a speedup acceleration, is detected by an acceleration sensor in the vehicle. The forward acceleration is thus the monitored driving parameter.

If the vehicle acceleration is above a predetermined threshold a maximum speed is stored as an acceleration event value. The maximum speed can occur during or without deceleration after an acceleration event in which the vehicle acceleration is above a predetermined threshold.

The acceleration event value is compared with a geostationary speed value of the place where the acceleration event value occurred. The geostationary speed value can be the statutory speed or prevailing speed at the location, area or locale where the acceleration event occurred.

This speed difference is a resulting value analog to the speed metric description.

From a plurality of such resulting values an acceleration quantity is determined, like by averaging the resulting values of by the mean of those resulting values.

In a further embodiment of the invention, the autonomous-driving quantity and the manual-driving quantities are determined as follows. They can be called "deceleration quantity" or "deceleration metric value".

During the operation of the vehicle a deceleration of the vehicle is detected by an acceleration sensor in the vehicle. In the following, the terms deceleration and negative acceleration are used analogously.

A speed difference between two speeds occurring at the beginning and at the end of an acceleration event, in which the vehicle deceleration is above a predetermined threshold, thus stronger than the threshold, is determined.

From this speed difference a resulting value is determined. The resulting value may be the speed difference as such, or the speed difference divided by a vehicle speed. The vehicle speed can be the speed at the beginning or end of the respective acceleration event, or it is the average speed over the acceleration event. The resulting value is stored as an acceleration event value.

From a plurality of such resulting values a deceleration quantity is determined, like by averaging the resulting values of by the mean of those resulting values.

In a further embodiment of the invention, the autonomous-driving quantity and the manual-driving quantities are determined as follows. They can be called "erratic driving quantity" or "erratic driving metric".

During the operation of the vehicle a positive and negative acceleration of the vehicle, each above a predetermined threshold, are detected by an acceleration sensor in the vehicle.

A time span between the positive and negative acceleration is stored as an erratic driving event value, or resulting value, respectively.

From a plurality of such resulting values an erratic driving quantity or erratic driving metric value is determined, like by averaging the resulting values of by the mean of those resulting values.

The autonomous-driving accident rate value is determined from those accident rate values which belong to manual-driving quantities which are associated to the autonomous-driving quantity. But not only the absolute value of one autonomous accident rate value is an indicator of weak points of the AI software. The category of the autonomous quantity, to which the autonomous-driving accident rate value belongs, gives valuable information about at which driving or traffic situations potential dangers may arise. Further, if more than one autonomous quantity is selected for association with manual metrics, the combination of these autonomous quantities—the combination of the values of the accident rate values dependent on their categories—provides a detailed multidimensional accident rate value vector which may deliver deep information about the character of one or more potential weak points of the AI software.

Accordingly, it is advantageous, if a plurality of autonomous-driving quantities are determined for different quantity categories, and each autonomous quantity is associated to a plurality of manual-driving quantities of the same category of different driving units, and for each quantity category an autonomous-driving accident rate value is determined.

Preferably, an overall autonomous-driving accident rate value is determined from a combination of the autonomous-driving accident rate values which are weighted according to respective driving distance in this combination.

Further, the invention is directed to a system for estimating an accident risk of an autonomous driving unit. According to the invention the system comprises a driving unit with a sensor system prepared for monitoring a driving parameter during a driving period driven autonomously by the driving unit, and an evaluation unit prepared for determining from this parameter a quantity quantifying a quality of the autonomous driving of the driving unit, for associating the autonomous-driving quantity to a plurality of manual-driving quantities, which have been determined from the same driving parameter during manual driving periods of different driving units, and for determining from accident rate values associated to those manual-driving quantities an autonomous driving accident rate value.

The evaluation unit can be a part of a vehicle of the driving unit or remote, like a stationary computational unit, as a server in a building. Further, the evaluation unit can be a mobile device carried within the vehicle, like a smart phone. Another possibility could be an evaluation unit with more than one device, like a mobile device and a stationary device, one device performing only a part of the method steps and the other device(s) performing the rest of the method steps.

While the invention as described is useful for estimating an accident risk of an autonomous vehicle, or the AI-control unit of the vehicle respectively, the idea of the invention may be used for estimating an accident risk of a manually driven vehicle or driving unit as well. The object of the invention would then be to provide a method for estimating an accident risk of a vehicle, which produces helpful results with less driving cycles.

This object is solved by a method for estimating an accident risk of a first driving unit, wherein from driving values, which have been determined from monitoring at least one driving parameter of the driving unit during driving—which can be autonomous or manual driving, a first driving quantity is determined quantifying a driving quality of the driving of the driving unit, the first driving quantity is associated to a plurality of second driving quantities, which have been determined from the same driving parameter during—preferably manual—driving periods of different driving units, and from accident rate values associated to those second driving quantities a driving accident rate value for the first driving unit is determined.

The above described details of the invention can be used in the same manner with respect to this further characteristic of the invention. Accordingly, the main claim can be replaced by this further characteristic of the invention and used with the dependent method claims as well. The artificial intelligence unit of the autonomously driving vehicle is then replaced by a manual driver driving the driving unit, from which the accident risk is estimated.

Further, the invention is directed to a system for estimating an accident risk of an autonomous a first driving unit, may it be an autonomous driving unit or a manually driven driving unit. According to the invention the system comprises a driving unit with a sensor system prepared for monitoring a driving parameter during a driving period driven autonomously or manually by the driving unit, and an evaluation unit prepared for determining from this parameter a quantity quantifying a quality of the autonomous or manual driving of the driving unit, for associating the driving quantity to a plurality of manual-driving quantities, which have been determined from the same driving parameter during manual driving periods of different driving units, and for determining from accident rate values associated to those manual-driving quantities an autonomous a driving accident rate value of the first driving unit.

The evaluation unit can be a part of a vehicle of the driving unit or remote, like a stationary computational unit, as a server in a building. Further, the evaluation unit can be a mobile device carried within the vehicle, like a smart phone. Another possibility could be an evaluation unit with more than one evaluation device, like a mobile device and a stationary device, one device performing only a part of the method steps and the other device(s) performing the rest of the method steps.

The above given description of advantageous details of the invention are combinable with one another. They contain numerous features, which are partially combined with one another in the dependent claims. Expediently, these features can also be considered individually and be combined with one another into further suitable combinations. More particularly, any method features can be combined with any method or device according to any independent claim individually as well as in any suitable combination. An independent formulation of a claim in the description only equals an explicit independent claim in this regard. Furthermore, features of any method, comprehendible as system features, can be considered as features of the corresponding system and, accordingly, features of the device, comprehendible as process features, can be considered as features of any method.

The above-described characteristics, features and advantages of the invention and the manner in which they are achieved can be understood more clearly in connection with the following description of exemplary embodiments which will be explained with reference to the drawings. The exemplary embodiments are intended to illustrate the invention, but are not supposed to restrict the scope of the invention to combinations of features given therein, neither with regard to functional features. Furthermore, suitable features of each of the exemplary embodiments can also be explicitly considered in isolation, be removed from one exemplary embodiment, be introduced into another exemplary embodiment for supplementation and/or be combined with any of the appended claims.

DETAILED DESCRIPTION OF THE INVENTION

Figure 1:
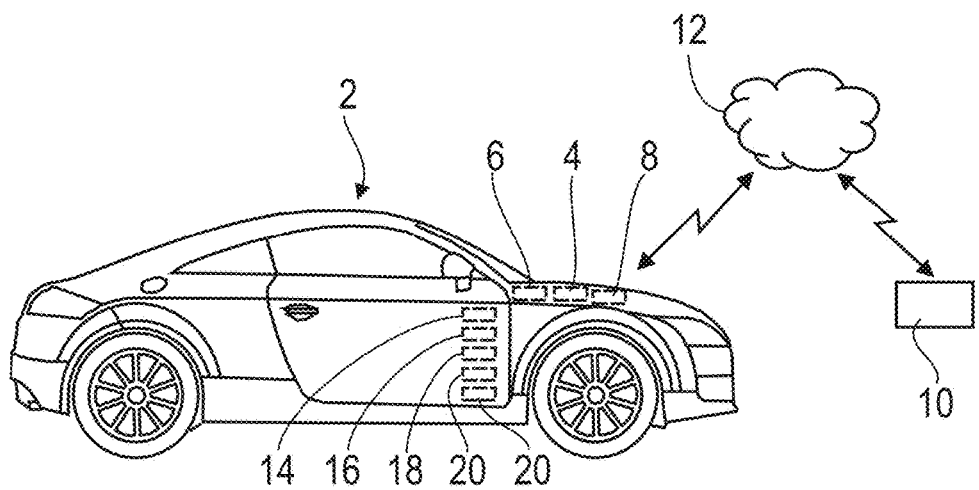
FIG. 1 is a schematic view of a passenger car with artificial intelligence software for autonomous driving.

Referring now to the figures of the drawing in detail and first, particularly, to FIG. 1 thereof, there is shown a vehicle 2 being a passenger car with a plurality of components, as an evaluation unit 4, a motion sensor 6 for detecting a turning angle of the steering wheel, and a long distance communication unit 8 for GSM communication with a remote server 10 through a network 12, like the internet. The server 10 can be part of a vehicle observation service for gathering vehicle driving data for evaluation of the vehicle driving. Those data can be further processed to determine a quality of driving of the vehicle 2, especially of autonomous driving of the vehicle 2.

The vehicle 2 contains further components, such as an autonomous driving control unit 14 with artificial intelligence software for controlling autonomous driving of the vehicle 2. A GPS unit 16 collects the current location of the vehicle 2 during driving. And an acceleration sensor 18 acquires the six-dimensional acceleration of the vehicle 2 during driving, three orthogonal translational dimensions and three rotational dimensions.

Instead or additional to the vehicle acceleration sensor 18 a mobile acceleration sensor may be present, like in a smart phone or other unit removably present inside the passenger cabin of the vehicle 2. Such unit moves with the vehicle 2 and is subjected to the same acceleration as the vehicle 2 as such or its acceleration sensor 18, and detects the same acceleration, therefore, as the acceleration sensor 18 of the vehicle 2. The same is true for the GPS unit 16, to which—additionally or alternatively—a GPS unit may removable be present inside the passenger cabin of the vehicle 2, like in a smart phone or other unit. In the following the GPS unit 16 and the acceleration sensor 18 refer to a unit immovably mounted in the vehicle 2 or removable present inside the passenger cabin of the vehicle 2.

Further, a plurality of driving assist systems 20 are present, like a lane guiding or lane change control, a breaking assistant, electronic stability control, and/or blind spot detection control. The motion sensor 6 detects a turning angle of the steering wheel and sends its data to the evaluation unit 4, which determines the turning angle rate over time or a steering wheel turning velocity, respectively, preferably as a function over vehicle speed. Instead, a steering motion, like of the wheels of the vehicle 2 or another unit involved in the vehicle steering, may be detected by motion sensor 2.

Over months and years, the vehicle 2 is driven manually and travels many manual journeys during which the driving is monitored by the sensors 6, 16, 18. From their data manual driving quantities are derived which serve as data basis for autonomous driving evaluation. In the following, the manual-driving quantities are manual-driving quality metrics, and the autonomous-driving quantities are autonomous-driving quality metrics. The term "metrics" indicates that the respective quantity is derived for plurality of driving units, preferably more than 1.000 driving units, in the same manner, and the metrics are comparable and ratable against each other. However, the following description is not limited to metrics, and the use of driving metrics can be replaced by driving quantities throughout the description.

One embodiment of the method can be characterized as follows:

1. Manual driving quality metrics are gathered from manual driving data and stored in a data base.
2. From data acquired during autonomous driving of a vehicle one or more autonomous driving quality metrics are gathered.
3. Optionally, for each autonomous driving quality metric a plurality of manual driving quality metrics are selected.
4. The autonomous driving quality metric is compared to the manual driving quality metrics and some of the manual driving quality metrics are associated to the autonomous driving quality metric by means of the comparison result.
5. From driving risk data, like accident rates, of the associated manual driving quality metrics a notional autonomous driving risk is quantified.
6. The autonomous driving risk may be used for enhancement of autonomous-driving artificial intelligence software or to detect a vehicle mounted sensor malfunction or a regression related to a software update, update or the level of accident risk associated with the navigation and/or control of said vehicle.

On the other hand, when use to estimating a driving risk of a manual driver, the autonomous driving control unit 14 with artificial intelligence software for controlling autonomous driving of the vehicle 2 might be present but is not active, since the vehicle is driven manually. Accordingly, the above steps read:

1. Manual driving quality metrics are gathered from manual driving data and stored in a data base. These manual driving quality metrics are gathered from other manually driven vehicles, then the manually driven first vehicle of step 2.
2. From data acquired during manual driving of the first vehicle one or more first manual driving quality metrics are gathered.
3. Optionally, for each first manual-driving quality metric a plurality of manual-driving quality metrics from the other vehicles are selected.
4. The first driving quality metric is compared to the further driving quality metrics and some of the further driving quality metrics are associated to the first driving quality metric by means of the comparison result.
5. From driving risk data, like accident rates, of the associated further driving quality metrics a notional first driving risk is quantified.
6. The first driving risk may be used for traffic control of sections where the first vehicle is driving to prevent an accident, or for detecting a malfunction of the first vehicle, or for sending information to the manual driver that his driving involves high accident risk.

Although both invention characteristics are useful, in the following only the characteristic of estimating the accident risk of autonomous driving is described in the following.

The above steps are described in detail in the following.

1. Determination of Manual Driving Quality Metrics

A driving quality metric preferably is a quantity characterizing the driving of a driving unit in a way that provides a quantified comparison to other driving quality metrics of other driving units. Preferably, each metric is individually rankable in positive and negative sense relative to the total population of—same category—metrics of the driving units. A driving quality metric can be a single value, referred to as driving quality metric value.

A driving value can be a measurement value of a driving parameter, like vehicle speed, vehicle acceleration, steering wheel angular motion, driving time between two driving events, or the like. Or it can be a combination of such parameter values constituted in a superior value. Preferably, an acceleration event, in which the vehicle acceleration is above a predetermined threshold, triggers the determination of a driving parameter from which the driving value is determined. One or more speed values, which stand in a predefined relationship to an acceleration event, can be assembled to a driving value. Preferably, the driving value is determined from the relation of one or more speed values to one or more geostationary speed values.

The determination of a manual driving quality metric can be subdivided into the following steps:

A. For a driving unit driving values are generated from manual driving over one metric period, like 2 years. From the driving values gathered over the driving period the driving quality metric is determined.
B. During each metric period different categories of driving values are determined, and for each category a driving quality metric is determined from the plurality of driving values of the respective category.
C. This is performed for a plurality of driving units.
D. For each driving unit and each category is assembled:
the driving quality metric,
a rating value, determined from a comparison of the metric with metrics of other driving units, and
a driving risk value.
E. These values may be assembled in a data file or any other suitable data package called metric file for short, in the following.
F Such metric files from all driving units and for all categories are stored in a database.

Step A: Generation of Driving Values

During driving of the vehicle 2 the GPS unit 16 acquires the current location and driving speed of the vehicle 2, the acceleration sensor 18 acquires the acceleration of the vehicle 2, and the motion sensor 6 determines steering wheel motion. From speed values, acceleration values, and/or steering wheel turning velocity values the evaluation unit 4 determines one or more kinds of driving values during each journey: Speed driving values, acceleration driving values, deceleration driving values, erratic driving values, steering values, and/or other suitable driving values.

Speed driving values can be derived as follows: The driving speed of the vehicle 2 is determined a plurality of times, like each at a random time point, the time point given by the evaluation unit 4. The location of the vehicle 2 where the speed was driven is associated to the speed values by the location unit 16. The speed and location data are sent to the remote server 10 through the network 12. There the speed and location data are compared with a geostationary speed value, like a statutory speed or prevailing speed value associated to the respective locations. Then the server 10 determines a speed difference between the driven speed and the statutory speed and stores this difference value in a file. The difference values may be separated from the location data and speed data, so that it is not possible to determine a driving speed to a speeding event, or a speeding event to a place where it occurred. Each speed difference value is a speed driving value.

Acceleration driving values can be derived as follows: The acceleration sensor 18 continuously determines the forward acceleration of the vehicle 2. If the vehicle acceleration is above a predetermined threshold, the speed of such acceleration event is monitored continually. The time span where the vehicle acceleration is above a predetermined threshold is the time span of the acceleration event. From the speed values the maximum speed occurring without deceleration in or after an acceleration event is stored as an acceleration event value. This value is sent to the server 10 which compares this value with the geostationary speed value of the place where the acceleration event value occurred. Each speed difference is an acceleration driving value.

Deceleration driving values can be determined as follows: The deceleration of the vehicle is monitored by the acceleration sensor 18 in the vehicle 2, thus the negative acceleration in driving direction. If the vehicle acceleration is negative and below a predetermined threshold, the speed of such acceleration event is monitored continuously. The time span where the vehicle acceleration is below a predetermined threshold is the time span of the acceleration event. A speed difference between the speed occurring at the beginning and the speed occurring at the end of such an acceleration event is divided by a third vehicle speed associated to the acceleration event. This third vehicle speed can be the speed at the beginning or end of the respective acceleration event, or it is the average speed over the acceleration event. If the third vehicle speed is the speed at the end of the respective acceleration event, the lowest valid speed may be predefined, like 1 km/h, thus if the vehicle is stopped, the end speed is set to 1 km/h. The value derived from this division is stored as deceleration value.

Erratic driving values can be derived as follows: During operation of the vehicle 2 a positive and negative acceleration in driving direction of the vehicle 2, each above a predetermined threshold, are detected by the acceleration sensor 18 in the vehicle 2. If such opposing acceleration events occur within a predetermined time span, like within 15 seconds, the time span between those positive and negative acceleration is stored as an erratic driving value.

From the driving values of one category the driving quality metric can be determined right away, like generating the mean or average of all driving values of one category over one metric period. However, it is preferred to generate intermediate values, called driving quality values, from the driving values first.

Driving Quality Values

The driving values are collected over a predefined driving period. A driving period, like a week or 300 km, is a part of a metric period, like two years or 10.000 km, a plurality of driving periods forming the metric period. The driving values of one driving period, one driving unit and one category are then assembled to a superior value: The driving quality value. The driving quality value can be the mean or median or another mathematical subsumption of some or all driving values generated during one driving period, with one driving unit and in one category. Since a metric can be generated from driving values or the superior driving qualities values, the driving quality values are called driving values as well, for the sake of simplicity. The driving values can be derived by the evaluation unit 4, or the remote server 10 of a driving observation service which has received the driving values.

If the driving quality values are determined as intermediate values, the above step A could read as follows:
- A1. For a driving unit driving values are generated from manual driving over one driving period, like 1 month. From the driving values gathered over the driving period a driving quality value is determined.
- A2. This is repeated for a plurality of driving periods, and from a plurality of driving quality values gathered in this way a driving quality metric is determined.

Metric Period

A metric period can be a time span, like a month or a quarter of a year, or a cumulated driving distance, like 1,000 km, 3,000 km or 10,000 km. If the metric period is a time span, the metric should only be assembled or used if a minimum driving distance is driven by the vehicle 2 during this time span. On the other hand, if the metric period is a predefined cumulated driving distance, the metric should only be assembled or used if this cumulated driving distance is driven during a maximum driving time span. For example, the metric period is three months, the minimum driving distance is 1,000 km. If the vehicle 2 drives less than 1,000 km during these three months, no metric is determined from the driving values gathered during this metric period, or the determined metrics are not used for driving quality determination.

The metric period can be a time span fixed by calendar dates, like two calendar years, or two years from a first driving date of the driving unit. On the other hand, it could be suitable, if the metric period is a running period. It could follow the current time reaching back a predefined time span, like two years back from the current date. The metric determined from driving values of this metric period will then be a running value, like the running average or a running median, the same being true for the other values of the metric.

Step B: Driving Categories

A plurality of driving categories or metric categories may exist, the categories being divided into a plurality of category groups. In the following embodiment four category groups are used, like:
- a. Category group of kinds of driving analysis, comprising a plurality of analysis kinds, like
    1. Speed Analysis
    2. Acceleration Analysis
    3. Deceleration Analysis
    4. Erratic Driving Analysis
    5. Steering Wheel Analysis (angle rate of turn over speed)
- b. Category group of locales of driving, comprising a plurality of locales, like
    1. Urban
    2. Rural
    3. Highway
- c. Category group of weather, comprising a plurality of weather conditions, like
    1. Normal
    2. Sun near horizon
    3. Rain
    4. Above 30° C.
    5. Below 0° C.
    6. Snow
- d. Category group of time of day, comprising a plurality of daytimes, like
    1. Normal daytime
    2. Morning rush hour
    3. Evening rush hour
    4. Night time These categories are directed to driving specification. However, additional categories directed to the vehicle 2 could be used as well, like vehicle classification, vehicle make, kind of drive, like 2-wheel drive or 4-wheel drive, or other vehicle equipment.

Altogether, all driving categories form an n-dimensional space, with discrete category space volumes, here a category metric space of 4 independent dimensions, each category group forming one dimension. In detail: Further to the kinds of analysis of driving, like speed analysis, acceleration analysis, deceleration analysis, and erratic driving analysis, the categories can be grouped into different locales of driving. Such locale categories can be rural driving, highway driving, and urban driving, or the like. Each driving segment where the vehicle 2 drove can be categorized into the respective locale, like urban. Over one driving period driving values are generated for each kind and for each locale—if the vehicle 2 drove in all locales during the driving period. The same is done for different weather conditions and/or different time of day.

In a definite example vehicle 2 drives manually over a driving period. During this time period a×b×c×d driving quality metrics are determined, a being five kinds, b being three locales, c being six weather conditions, and d being four time of day categories, all together resulting in 360 driving categories, all for one driving period and one driving unit.

The higher the number of metric categories is, the lesser is the number of driving values present per metric. It could, therefore, be useful to subsume more than one category of one group into a super-category to prevent that too few driving values are present in one category. This clustering could be done in a manner that merges categories that have not shown metrics with relevant information with regard to accident rates or other driving quality aspects. Another measure could be to discard all categories with less driving values than a predefined number of values per category.

In the following, for the sake of simplicity, only two groups of categories, kinds and locales, are used for further description. This choice is not meant as limitation of the embodiment, and any number and type of category group may be used for deriving driving quality metrics.

It is important to note that the driving values are assembled from manual driving, i.e. driving values which were determined during manual driving. This is done for a plurality of driving units, like vehicle 2, over a plurality of metric periods for each driving category. If the vehicle 2 or another vehicle drives autonomously, driving values are determined in the same way for the same categories.

Step C: Driving Units

The driving values are determined for a plurality of driving units, preferably at least 1.000 driving units, better more than 10.000 driving units. By this measure a large amount of manual-driving metrics are present with which an autonomous-driving metric can be compared or matched, resulting in a more reliable autonomous driving risk assessment.

For each driving unit a data file is present, like in the server 10, in which the driving values are present, and which may be associated to the driving unit.

A driving unit can be a driver, or a vehicle, like the vehicle 2, or a combination of a driver and a vehicle. Preferably, a driving unit is a connection of one driver in one vehicle. If the driver drives in another vehicle, he is seen as separate driving unit. And the other way around: If a vehicle is driven by more than one driver, every driver in this vehicle is a distinct driving unit.

If only one driver drives a vehicle, the definition of the driving unit is clear. If one known driver drives more than one vehicle, the definition is clear as well, since then the number of driving units is the number of vehicles the driver drives. On the other hand, if more than one driver drive one vehicle, driver recognition is useful, so that a driven journey can be associated to one driver and thus to one driving unit.

For example, driving quality metrics are derived from all vehicles of a company, like all vehicles insured by a driving insurance company. Then a huge amount of driving quality metrics is present. If no driver discrimination is possible or made, each vehicle forms one driving unit. If only one driver is associated to one vehicle, the driving unit is the vehicle or the driver.

Step D: Assembling of Metric Files

For each metric a rating value and a driving risk value is determined. The rating value results from a comparison of the metric with other metrics of the same category of other driving units.

The Rating Value

The rating value indicates a rank of driving quality within the total population of metrics of the same category or within a selected group of metric values. For this, the value range of the metric population is oriented in a side of good driving and a side of bad driving, low metric values indicating bad driving and high values good driving, or the other way around. Each metric value can then be ranked versus the other metric values with regard to good or bad driving.

The rating values in the database—all or only a selected group of them—may be distributed in a Gaussian distribution, wherein the rating value under consideration has its position in this distribution, somewhere between 0% and 100%. If, in an example, the metric value is −2.1 km/h, and the position of the metric value in the distribution is at 62% which is close to the average of 50% of the distribution. 62% means that 62% of all metric values of the distribution have a lower value, and 38% have a higher value. If the low end reflects good driving and the high end bad driving, 62% of the metrics are better than −2.1 km/h, and 38% are worse.

The Accident Rate

The accident rate results from the driving history of the driving unit. It reflects the driving risk in mileage per accident, retrieved from the past accident history of this driving unit. When a data retrieval with a driving unit starts for later determination of the driving metric, information may be present about when the last accident of this driving unit occurred. Then the accident-free mileage from the last accident up to the beginning of the data retrieval or up to a current date can be used as accident rate.

If information about more than one past accident is present, then an average mileage per accident may be used. For example, the driving unit is one specific driver in one specific vehicle 2. In the past the driver has had more than one accident resulting in an accident rate per cumulated driving distance, in this specific example one accident per 48.169 km. This value is taken as accident rate in all driving metrics of the driver which are generated since the occurrence of the last accident.

If some time later the driving unit is involved in an accident, like at km 97.235 km after the last accident—or more general: after an accident rate starting point, the accident rate in the driving metrics of the database, which are generated since the occurrence of the last accident, can be updated with the effective accident rate of 97.235 km. Then all metrics generated from this driving unit within the last 97.235 km receive the accident rate (AM: accident mileage) 97.235 km.

If no accident is present, the respective metric can be discarded or a notional accident rate can be associated to the metric. If the mileage of the driving unit is below a predefined threshold value, like 10.000 km, no accident rate is set. The metric should then not be used for determining an accident risk for autonomous driving, it can be omitted at the moment. If some time later the accident-free mileage exceeds the threshold value, or an accident occurs, then the respective accident mileage is associated to the metric, which is usable then.

If the accident-free mileage of the driving unit is above the predefined threshold value, a notional mileage can be associated to all metrics generated from this driving unit during this accident-free driving. The notional mileage can be a fixed mileage, like 100.000 km, or be determined from the statistical probability for accident occurrence at the level of current accident-free driven mileage, i.e. from the current accident free mileage of the driving unit the statistical mileage may be determined for the next accident. For this the driving history of other driving units may be used. If, for example, the current accident free mileage is X km, the driving history of all driving units with X km accident-free driving and a known later accident can be evaluated at what mileage the later accident occurred. From those mileages a statistical accident mileage can be derived which can be used a notional accident risk mileage for the driving unit under consideration.

In the statistical evaluation the accident probability percentage may be included. The notional accident risk mileage can thus be set at the mileage, where Y % of the driving units—which had reached X km accident-free driving— have had an accident. Preferably, accident probability percentage is set conservative, i.e. at a low value, preferably below 30%, so that the accident rate is lower than the average rate of the driving units with a current accident free mileage of X km. In general: Bayesian probability can be used to determine the statistical accident rate.

For example: A driving unit had an accident 45.678 km after the last accident before or an accident rate starting point. All metrics assembled from the current data of driving parameters receive the accident rate of 45.678 km. The driving continues, and the accident-free mileage reaches 34.567 km from the last accident. At this accident-free mileage the Y %-probability of accident exceeds the current accident rate of 45.678 km. Then the current accident rate—based on the real last accident—can be updated by a notional accident rate reflecting the statistical mileage of the next—fictitious—accident. During further driving this notional accident rate increases continuously. If a next accident occurs, the accident rate is updated again with the real accident mileage.

In a further aspect, an accident severity or accident category can be taken into account. Here as slight parking bump is rated differently than a heavy highway accident ending in a total damage of the vehicle. Then the driving accident rate can be a mileage per accident value, wherein the value reflects accident severity, i.e. a heavier accident is associated to a higher accident value than a slighter accident. In the example shown in the below table the driving accident rate is rated to each accident, no matter how severe it is.

Specific Example

To give a specific example, four kinds of quality metrics are generated, each over three locales, resulting in twelve quality metrics $^{m/a}_{i}M_L^K$. Here, m/a indicates if it is a manual-driving quality metric or an autonomous-driving quality metric, and i is a running numeral indicating the identification number of the metric or the time period and the driving unit. K is the kind of the metric, distinguishing S: speed metric, A: acceleration metric, D: deceleration metric, and E: erratic driving metric. And L indicates the locale, distinguishing U: urban area, R: rural area, and H: highway driving. For example, $_{1234}^{m}M_H^D$ is a manual deceleration metric #1234 with data gathered from highway driving.

To each metric, or metric value, respectively, the rating value is determined. In the example, the twelve metrics are stored in a database together with the a plurality of values, as shown in the following table for the four kind of highway metrics of the time period 1234 collected from vehicle 2.

|  | Metric Value MV | Rating Value CV | Accident rate AM | σ | n |
|---|---|---|---|---|---|
| $_{1234}^{m}M_H^S$ | −2.1 km/h | 62% | | ... | ... |
| $_{1234}^{m}M_H^A$ | 2.5 km/h | 43% | | ... | ... |
| $_{1234}^{m}M_H^D$ | 5.6 | 3.1% | | ... | ... |
| $_{1234}^{m}M_H^E$ | 15 s | 57% | | ... | ... |

This example table contains only the four kinds of manual highway metrics, for simplicity. In reality the metrics of the other category group(s) are present as well, like the three locales in this example, the table becomes a multi-dimensional table, like a three-dimensional table with twelve metrics in this example.

Each metric together with its associated values are stored in a metric file, all metric files are stored in the data base. Each metric file contains the metric and further values characterizing the metric. These values may be The metric value, The rating value, An accident rate, The standard deviation 6 of driving values or driving quality values of the respective metric, and/or the number n of driving values or driving quality values used for generation of the respective metric.

The driving quality metric value MV can be the average or median of the driving values contained in the metric. MV=−3.1 km/h with respect to the speed metric implies that the median speed of the vehicle 2 during the driving period 1234 was 3.1 km/h lower than the prevailing speed of the traffic at the locations and time of day where the speed was determined. In another example the metric value can indicate the difference to the statutory speed limit at the locations and time of day where the speed was determined.

MV=2.5 km/h with respect to the acceleration metric implies that the average or median speed of the vehicle 2 during acceleration events of the driving period 1234 was 2.5 km/h higher than the statutory speed limit or the prevailing speed of the traffic at the locations and time of day where the speed was determined.

MV=5.6 with respect to the deceleration metric implies that the median of the values:

$$(Sb-Se)/Se$$

is 5.6, wherein

Sb is the speed at the beginning of the heavy braking event, and

Se is the speed at the end of the heavy braking event.

And 15 s with respect to the erratic driving metric implies that the median time span between strong acceleration events and successive strong deceleration events, or strong deceleration events and successive strong acceleration events respectively, was 15 seconds, wherein only time spans up to a predefined time span maximum, like 60 seconds, were considered.

With regard to the rating value, if one end of the distribution is considered to be the "bad end" indicating some driving risk and the other end is considered the "good end" with no driving risk conspicuity, the rating value is an indicator of some driving risk (a rating value more at the "bad end") or an indicator of normal driving (a rating value more at the "good end"). Accordingly, the rating value of 3.1% of the deceleration metric drops out and indicates that 96.9% of the compared metric values stand for better driving with regard to deceleration metrics. This is an indicator of nervous or precarious driving, resulting in heavy braking events ending at low speed.

Eventually, at the moment of metric compilation, the accident rate is not fixed, because no accident occurred during a low mileage under the threshold mileage. If at some time later the threshold mileage is reached, the notional accident mileage is associated, or if an accident occurs, the accident mileage is used. In the example, an accident occurred later at 97.235 kilometer after the accident before, and the driving accident rate is set 97.235 kilometer per accident for the file #1234 or metric #1234, respectively.

At that moment the table is complete:

|  | Metric Value MV | Rating Value CV | Accident Rate AM | σ | n |
|---|---|---|---|---|---|
| $_{1234}{}^m M_H^S$ | −2.1 km/h | 62% | 97.235 km | ... | ... |
| $_{1234}{}^m M_H^A$ | 2.5 km/h | 43% | 97.235 km | ... | ... |
| $_{1234}{}^m M_H^D$ | 12 km/h | 3.1% | 97.235 km | ... | ... |
| $_{1234}{}^m M_H^E$ | 15 s | 57% | 97.235 km | ... | ... |

Here σ is the standard deviation σ of metric values of the respective metric, and n indicating the number n of events contained in the respective metric, the specific numbers have been omitted in the tables for the sake of clarity of the tables. The above table is stored in a driving history file, each driving history file containing the data of one driving quality metric.

Figure 2:
FIG. 2 shows a table of general content of driving history files.

The database contains the metric files of a plurality of driving units. FIG. 2 shows a plurality of such driving history files, each containing the metric files of one metric period, one driving unit, and all categories. In this embodiment, there are twelve driving quality metrics categories present: Four types and three locales, each as described above, wherein the locales are not shown in FIG. 2 for the reason of simplicity. The driving period is twelve months, for example, however, any other period can be chosen. So each driving history file per FIG. 2 simply contains for one driving unit, like one vehicle 2 insured by one company, the record of its annual driving quality metrics. Each file contains for each of the respective driving quality metric a distribution curve describing the distribution of the driving values or the driving quality values generated over the metric period, and further the respective driving quality metric values, the rating values and the accident rates.

2. Determination of Autonomous Driving Quality Metrics

In the above example the metrics are composed from manual driving values which occurred during driving of the vehicle 2 during a metric period. However, manual driving values generated from the driving of different drivers using one vehicle may be separated, so that each driver in one vehicle forms a separate driving unit. If a driver chooses autonomous driving, the respective autonomous driving software is treated as separate logical or virtual driver and thus as separate driving unit, and respective autonomous driving quality metrics are generated during autonomous driving. In another example, a purely autonomously driving vehicle is treated as driving unit and is used for generating autonomous driving quality metrics.

In general: The term "driving unit" can be broadened in the sense that autonomous-driving artificial intelligence software is treated as separate driver. Of course, if the same autonomous-driving software is used in different vehicles, each vehicle is seen as a separate driving unit, analogous to a human driver driving more than one vehicles.

For example, the vehicle 2 is normally driven by two persons, and is able to be driven purely manually or autonomously up to level 3. Then three driving units are present: Two manual units, one for each person, and one autonomous unit. If a handover time from autonomous driving to manual driving is playing a major role, and both human drivers react totally different at handover demand, two autonomous driving units should be distinguished, resulting in four driving units, altogether.

In general, autonomous driving at level 4 or 5, i.e. purely autonomous driving, can be treated as virtual driver or AI-driver. Autonomous driving at level 1 to 3, however, is a mixture of autonomous driving and manual driving. Properly speaking, this is no autonomous driving. Nevertheless, it could be useful to treat at least level 2 and 3 as autonomous driving as well, at least during those driving sections where the driving was undertaken by the AI-software, or where hands-off driving was allowed by respective driving rules of the autonomous driving level. If during one journey only a part of the journey was driven autonomously, like level 2, and the rest manually, the journey is treated as being driven by two driving units, one autonomous driving unit for the level 2 section and one manual driving unit for the manual section. With regard to the invention, autonomous driving levels 2 to 5—as currently defined by the Society of Automotive Engineers (SAE)—are seen as autonomous driving, especially even level 1 to 5.

For each driving unit a driving history file with a set of metric files is generated containing the metrics of all categories—if usable. With the advent of autonomous driving, each such vehicle 2, when under artificial intelligence control, will have its driving dynamics quantified as driving quality metrics that are identically derived than those compiled when under manual control. In operation however, the autonomous driving quality metrics are of course separately compiled as if they belonged to a surrogate authorized driver—who just happens to not be totally human.

Moreover, autonomous driving quality metrics may be compiled for each autonomous driving level separately, as the driver may opt at times for more or less hands-on involvement. Autonomous driving at level 2 is thus assigned to a different driving unit than autonomous driving at level 3. Hence what is described above can be repeated for each autonomous driving level that has been driven during a driving period to provide separate data for each autonomous level usage.

3. Selection of Autonomous and Manual Driving Quality Metrics

To access the driving risk of autonomous driving, an autonomous-driving quality metric is associated to a plurality of manual-driving quality metrics. This step is based on the idea that autonomous driving and manual driving may share the same weaknesses in special driving situations. However, not all driving data are suitable for finding the driving risk of autonomous driving. Therefore, from the available autonomous or manual metrics a selection is made, preferably from both types of metrics, autonomous and manual.

Selection of Autonomous Driving Quality Metrics

For selecting suitable autonomous-driving quality metrics their rating value is used which is determined in the same way as the rating value of the manual-driving quality metrics. The autonomous metric value is compared with the metric values of the manual metrics of the same category. Again, the autonomous metric value is ranked against the population of metric values of the manual metrics of the same category, resulting in the autonomous rating value, like 87% which is a value for rather dangerous driving, or 11% which indicates high quality autonomous driving.

If during one driving period a plurality of autonomous metrics is present, like twelve autonomous metrics analogously to the example above, or even 360 autonomous metrics, only those with an autonomous rating value within a predefined percentile are selected for deriving of the autonomous-driving risk, like all autonomous rating values within the range 80% to 100%. The predefined percentile may be a predefined rating value as threshold value. Or the autonomous metric with the worst rating value is selected together with those autonomous metrics with rating values predefined close to the worst rating value, like up to 10% better than the worst rating value.

By this measure only those autonomous metrics which show potential weakness with regard to accident risks are selected omitting those which indicate low risk driving. Since the goal of this measure is finding potential software weaknesses with regard to accident risks, low risk metrics are of no interest.

Selection of Manual Driving Quality Metrics

The selected autonomous-driving quality metric(s) is/are associated to manual-driving quality metrics. But again, not all manual metrics are suitable for uncovering potential accident risks. It is useful, therefore, to make a selection among the manual metrics. For such selection one or any combination of the following restriction parameters may be used.

A first restriction parameter is the category. Preferably, only manual metrics of the same category are associated to the autonomous metric, so an autonomous speed highway metric is associated to manual speed highway metrics only.

A second restriction parameter is the rating value. Only those metrics—manual and/or autonomous—are consulted for association which have a predefined rating value, like above 95%. By this, the autonomous metric is associated only to those metrics which are suspicious with regard to driving danger. With regard to the above example, only the highway metric $_{1234}{}^m M_H^D$ is used for assignment, the other three highway metrics kinds are discarded since they do not indicate any dangerous driving.

A third restriction parameter is the age of the manual metric. Driving habits of a driver or a society of drivers may change over time. This may have to do with changing traffic rules or advancements of driving abilities of a driver or advancements in technical abilities of the vehicles. Preferably, only those manual metrics are selected for possible association with an autonomous metric, which do not exceed a predefined age, like since their final compilation. Another option is the compilation of running metrics. Here the metric period is not fixed but follows the current time. An example is a first metric period from the current time backwards six months, a second metric period backwards from seventh to twelfth month, and so on. The metric value for each metric will then be a running average or a running median, the same being true for some or all the other values of the metric. Even the accident rate may be running in the event of accident-free driving, where the notional accident rate changes with each accident-free driven further distance.

4. Comparison of Autonomous and Manual Driving Quality Metrics and Association

Autonomous and manual metrics may be compared, preferably as a means for (further) selection. If a preselection according to the above step #3 is performed, each selected autonomous metric may be compared with the set of the selected manual metrics. The result of this comparison may again be a restriction of the set of manual metrics, the comparison can thus be seen as further restriction. The associated restriction parameter can be the metric value of both, the manual and autonomous metrics as such. Only those manual metrics are selected which are sufficiently close to the autonomous metric. Sufficiently close may be defined by a predefined threshold value, like ±1 km/h or in absolute terms as being the closest.

One or more further restriction parameters may be taken for further reducing the subset of assigned metric values, of course.

Figure 3:
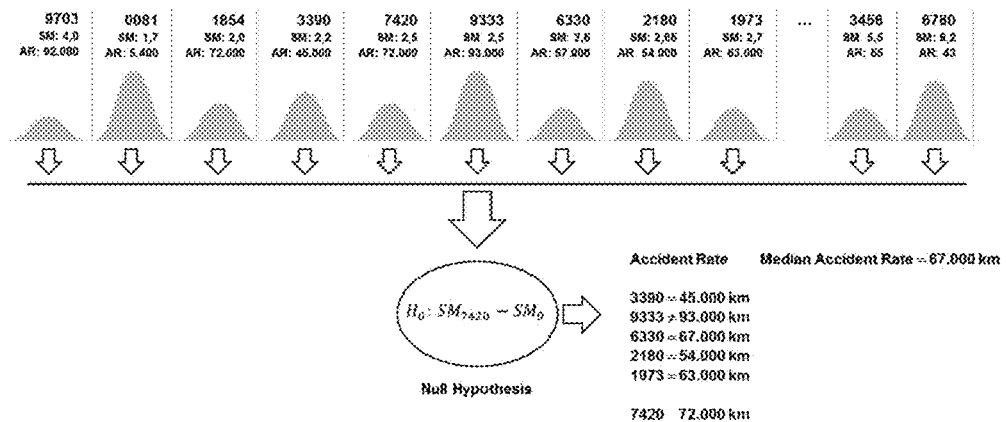
FIG. 3 shows an assignment of an autonomous-driving quality metric value with a plurality of manual-driving quality metric values.

FIG. 3 shows the assignment of an autonomous-driving quality metric with value 2.5 km/h to a plurality of manual-driving quality metrics. The assignment is restricted to only a subset of all driving metrics present in the database.

In the following example a driver prefers to drive autonomously during long distance highway cruise. Accordingly, autonomous driving data are gathered for the four types of metrics in the locale "highway". Let's say that during one driving period the autonomous driving metric of type "speed" and locale "highway" results in the driving quality metrics value of 2.5 km/h.

The autonomous metric value, in the example 2.5 km/h, is set as reference value. Then only those manual metrics, which show a metric value within a predetermined boundary around the reference value, are selected. The threshold value may be ±1 km/h, for example, all manual metrics with a metric value between 1.5 km/h and 3.5 km/h are chosen for further selection or assignment to the autonomous metric.

A further restriction parameter is a statistical similarity of the (selected) manual metrics to the autonomous metric under examination. A statistical similarity may be quantified by a statistical test, like a Null Hypothesis test. Only those manual metrics are associated to the autonomous metric, which pass the Null Hypothesis test, like a Gauss test, and which are statistically similar, accordingly. The Null Hypothesis test can be performed relative to the autonomous vehicle metric value used as a pointer into the entirety of the selected manual metrics.

The above restriction parameters can be chosen—one alone or two, three or more in combination—as is useful for deriving an AI software accident risk. In the following, all restriction parameters are chosen in combination. First, only one or more risk-relevant autonomous metric(s) are selected. Then, from all manual metrics contained in the database only those are chosen which have the same category as the autonomous metric under consideration. Third, only those metrics are chosen, which rating value is above 90% and which do not exceed a specific age. Further, only those remaining manual metrics are selected, which have a metric value predefined close to the autonomous metric value, like <±1 km/h. Then Null Hypothesis testing is applied and only those manual metrics remain, which pass the test.

With regard to Null Hypothesis: Since computationally each of these manual driving quality metrics is an "averaged value" of individual driving values or driving quality values over the metric period, according to Central Limit Theorem the resulting distribution of "averaged random variables" is a Normal Distribution, and thus Null Hypothesis is applicable. This result follows even though the related initial raw data values—the original driving value distributions—was not a normal distribution, as is the likely case with driving quality metrics.

In other words, per FIG. 3, the database is accessed, and there only the metrics are selected according to the chosen restriction parameters, in the example of FIG. 3 speed highway metrics with CV 10%. Those metrics are ordered by speed metric values, and those vehicle history manual driving records (e.g. 3390, 9333, 6330, 2180, 1973) are collected for statistical testing which metric values are close to the 2.5 km/h autonomous speed highway metric value.

The Null Hypotheses testing, as depicted in FIG. 3, uses the below formulation which is a Student's t-distribution based test, which allows differences in standard deviation $\square$ for two different means. The Student's t-distribution based test may converge to the Z-normal distribution z-test when the number "n" of events exceeds nominally 30. Where the test statistic being Null Hypotheses tested is a median rather than an average, then non-parametric Null Hypotheses testing can be used, such as Mood's median test which is a well established special case of Pearson's chi-squared test.

Depending on the metrics, the median value may be the best way to express the composite value of multiple journey driving quality metrics in a manner that is most relevant to a vehicle's driving accident rate which itself may cover an indeterminately long time span.

All the following process applies whichever method of statistical Null Hypotheses testing is used.

In structuring an example of Null Hypotheses testing to determine a relevant set of driving metrics related to a given autonomous driving metric, Null Hypotheses tests can be used based on the Z statistics, or Gauss test, by the relationship:

$$Z = \frac{(\overline{X}_1 - \overline{X}_2)}{\sqrt{\left(\frac{\sigma_1^2}{n_1} + \frac{\sigma_2^2}{n_2}\right)}}$$

where is designated:

$\overline{X}_1$: The respective driving metric values from each manual driving metric chosen for comparison. In more detail, the value $\overline{X}_1$ is the corresponding manual quality metric value from adjacent quality metrics when the quality metrics are arranged around and near the autonomous quality metric value, where each respective $\overline{X}_1$ is characterized by its variances $\sigma_1^2$ and number of events $n_1$.

Depending on how it is decided to pose the Null Hypotheses logic for determining the interval of related driving metrics, $\overline{X}_2$ can be:

The autonomous vehicle driving quality metric value with its characteristic variance $\sigma_2^2$ and number of events $n_2$.

Or

The driving quality metric value (with its characteristic variance $\sigma_2^2$ and number of events $n_2$) of the specific manual metric value that matched most closely numerically the autonomous metric value under examination from the autonomous vehicle.

By such Null Hypothesis testing those metrics are isolates that relate to quality metric value $\overline{X}_2$ and are then used in the following steps to project the driving accident rate for the autonomous vehicle.

In the shown example five of the six historic manual driving metrics pass the Null Hypothesis test. These metrics are selected for association with the autonomous metric. In general: Those manual metrics which remain after application of all used restriction parameters to the pool of manual metrics are selected for association with the autonomous metric.

5. Determination of the Notional Autonomous Driving Accident Rate

The association of a plurality of manual metrics with the autonomous metric under observation can be done by association of the manual accident rates of the selected manual metrics to the autonomous metric, either as a group of values or as a condensed value, like the mean or median of the selected manual accident rates. Such condensed value can be seen as autonomous accident rate, and indicates the safety of driving or handling of the vehicle 2 by the artificial intelligence software during autonomous driving of the vehicle 2.

In other words: Each manual metric has its heuristic respective driving accident rate value. From the manual accident rate values an autonomous accident rate value is computed, like by averaging the manual accident rate values or by the median of those manual accident rate values. The use of the median value as the expected accident rate and not the average helps to avoid the chance of being led astray by an anomalous driving accident rate such as a reckless driver who just "lucks-out" and never has an accident or a very good driver who just makes a bad move. The use of a cluster of Null Hypothesis like-related metrics gives a broader, more stable sample from which to compute the expected autonomous accident rate value. The expected autonomous accident rate value will be associated with the autonomously driven vehicle 2 that yielded the speed metric value, like 2.5 km/h in the example.

6. Deriving Autonomous Driving Quality and Enhancement of Software for Autonomous Driving If the expected autonomous accident rate value is rather low, this information may be a hint to potential weaknesses of the abilities of the artificial intelligence software in use for autonomous driving that led to the low expected autonomous accident rate value. The software can be reprogrammed to eliminate the potential weaknesses, and the software can be enhanced without the need of long testing periods and occurring autonomous driving accidents. The same process may also be used to infer degradation if we seek to assess if a software or hardware update has adversely affect safety.

But not only the absolute value of the notional autonomous accident rate value is an indicator of weak points of the AI software. The category of the autonomous metric under observation gives valuable information about at which driving or traffic situations potential dangers may arise. Further, if more than one autonomous metric is selected for association with manual metrics, the combination of these autonomous metrics—the combination of the values of the notional accident rate values dependent on their categories—provides a detailed multidimensional accident rate value vector which may deliver deep information about the character of one or more potential weak points of the AI software.

Figure 4:
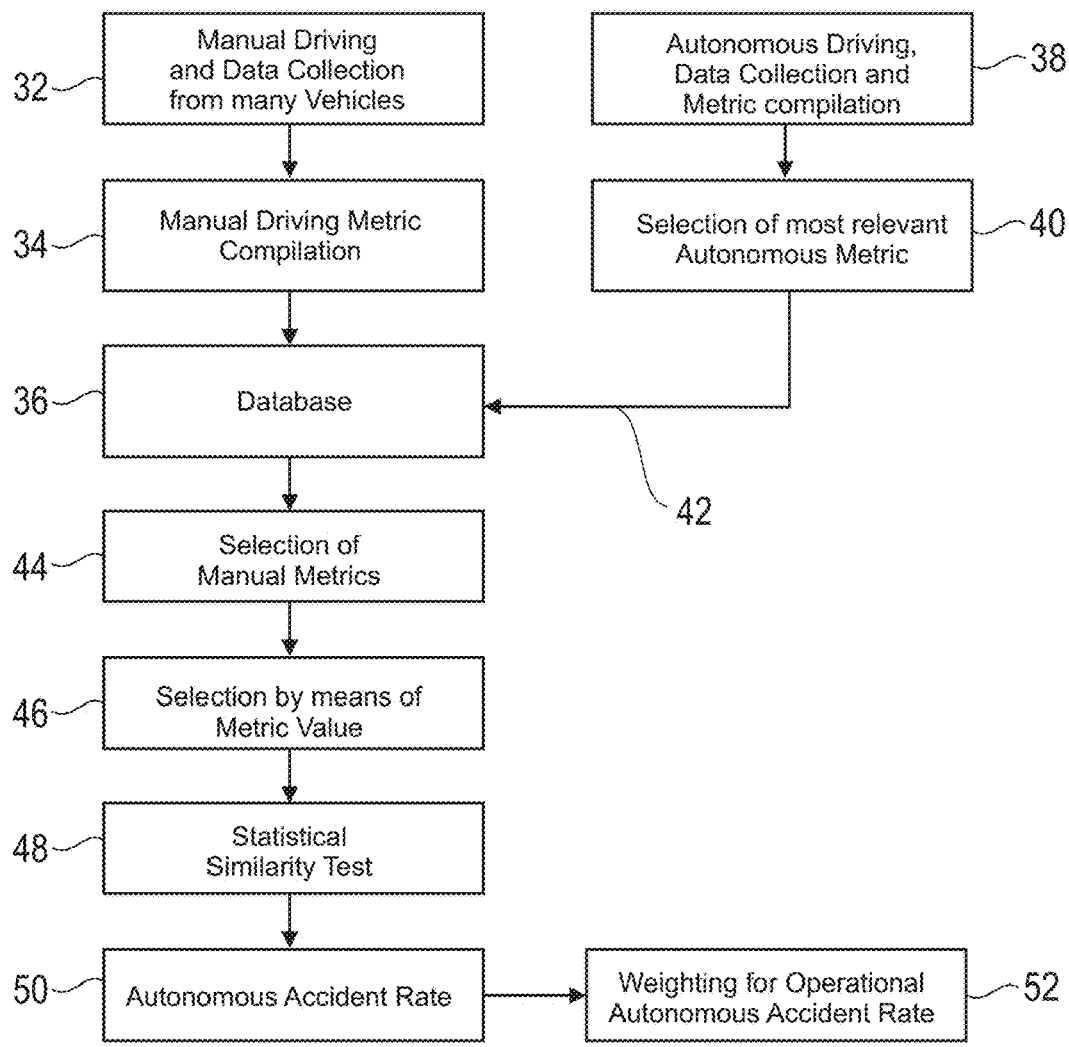
FIG. 4 shows a flow diagram of a method for estimating a driving accident rate of a vehicle.

FIG. 4 shows a flow diagram of the method for estimating an accident risk of an autonomous vehicle. The method starts with step 32, where for a plurality of driving periods and for a plurality of driving units driving quality metrics are compiled from manual driving for all categories of metrics. From those data in step 34 for each driving period the metric file is assembled for each metric, which contains the metric, the rating value of the metric the associated driving accident rate, the number n of the driving (quality) values constituting the metric their standard deviation σ, and a serial number of the file/metric.

The compiled metrics are stored in a database 36.

When autonomous driving data are present from a driving period, in step 38 autonomous driving quality metrics are compiled from autonomous driving for some or all metric categories. It will depend on the presence of the data which category is chosen for generating one or more autonomous driving metrics. If for example, data in a category have low expressiveness, like if too few data are present in this category, the generation of the respective metric may be omitted. On the other hand, there may exist some type and locale metric with high significance with regard to accident rated prediction. That is for example—a good speed metric value for a given vehicle 2 can frequently be associated for the same vehicle 2 with a high-risk deceleration metric value. Hence, in this example, the occurrence of an accident is more likely to be associated with events connected with this vehicle's deceleration and the deceleration metric becomes the marker most likely to be associated with an accident.

Since accident liability is incurred when any of the driving activities, measured as driving quality metrics, triggers a chain of events that results in an accident, it is best to focus on those autonomous driving generated quality metric(s) that indicates the highest accident risk. Thus, in step 40 those autonomous metrics category/categories are chosen for further processing which reflect a high accident risk. The category may be chosen as described above, like one or more single categories. Or a group of categories are selected, like all deceleration metrics.

With those data the database 36 with the manual metrics is accessed in step 42. The method then proceeds in step 44 with the selection of the manual metrics according to one or more restriction parameters. For example, only those manual metrics are selected, which have the same category than the autonomous metric under consideration, and which have a low rating value.

Then, in step 46, with the autonomous metric under consideration, in this case 2.5 km/h, the database with the manual metrics data is accessed and those manual metrics of the same type and locale are chosen for further processing which have a metric value similar to the autonomous metric value, like <±0.5 km/h. The chosen group of metrics is statistically tested via Null Hypothesis in step 48, and only those metrics are kept for the next step for which the test is positive.

From this kept metrics the median driving accident rate is determined in step 50, so that for each autonomous metric category one summarized manual driving accident rate is present. This summarized manual driving accident rate is assigned to the autonomous metric.

Then, if more than one notional autonomous accident rates are present, since more than one autonomous metric was chosen in step 40, the notional accident rates are weighted by their driving distance in step 52, so that an accident rate derived from long driving is rated heavier than an accident rate derived from only a few kilometers driving. The weighting may be performed by:

> Operational expected accident rate=(percentage of driving distance of locale 1)×(expected accident rate locale 1)+(percentage of driving distance of locale 2)×(expected accident rate locale 2)+ (percentage of driving distance of locale 3)× (expected accident rate locale 3).

The operational expected accident rate represents the accident risk over all categories as captured in this array of quality metric values for a given vehicle 2 while driven under autonomous control. The operational expected accident rate can then be used by software engineers to find possible weak point in the artificial intelligence software which controlled the autonomous driving from which the operational expected accident rate was derived.

The invention claimed is:

1. A computer-implemented method for controlling an autonomous vehicle, the method comprising:
    monitoring with a sensor in the autonomous vehicle, at least one driving parameter of the autonomous vehicle during autonomous driving and determining driving values;
    by a server, determining an autonomous-driving quality metric which quantifies an autonomous-driving quality of the driving of the autonomous vehicle based on the determined driving values;
    accessing a manual-driving quality metrics database including a plurality of manual-driving quality metrics, which have been determined from the at least one driving parameter during manual driving periods of different autonomous vehicles;
    by the server, pre-selecting, according to one or more restriction parameters, a group of manual-driving quality metrics from the plurality of manual-driving quality metrics stored in the database;
    by the server, selecting metrics from the pre-selected group of manual-driving quality metrics that show a predetermined degree of statistical similarity with the determined autonomous-driving quality metric, wherein the predetermined degree of statistical similarity is tested by Null-Hypothesis;
    by the server, determining an autonomous-driving accident rate value from accident rate values associated with the selected manual-driving quality metrics; and
    updating autonomous-driving control software of the autonomous vehicle based on the determined autonomous-driving accident rate value, and controlling the autonomous vehicle by the autonomous-driving control software that was updated.

2. The method according to claim 1, which comprises deriving the manual-driving quality metric in the same way as the autonomous-driving quality metric.

3. The method according to claim 1, which comprises generating driving values for a plurality of autonomous vehicles from manual driving over a predefined period, and determining for each autonomous vehicle, a manual driving quality metric from the driving values gathered over the entire predefined period.

4. The method according to claim 1, wherein each of the manual-driving accident rate values are a mileage per accident and are determined from an accident statistic of one autonomous vehicle.

5. The method according to claim 1, which comprises determining from one or more driving parameters being monitored during manual driving of the different autonomous vehicles, a plurality of manual-driving quality metrics of different categories from which only those are chosen for association with the autonomous-driving quality metric which belong to the same category as the autonomous-driving quality metric.

6. The method according to claim 5, wherein the categories are a plurality of different locale categories where the driving parameter was monitored.

7. The method according to claim 1, which comprises selecting only those manual-driving quality metrics for association with the autonomous-driving quality metric which have a bad driving rating value below a predefined threshold compared with a group of manual-driving quality metrics.

8. The method according to claim 1, wherein the autonomous-driving quality metric is associated with the manual-driving quality metrics only if the autonomous-driving quality metric has a bad driving rating value below a predefined threshold compared with a group of other autonomous-driving quality metrics.

9. The method according to claim 1, which comprises selecting from a multitude of manual-driving quality metrics for association with the autonomous-driving quality metric only those manual-driving autonomous-driving quality metric.

10. The method according to claim 9, wherein the predetermined degree of similarity is a value difference of the autonomous-driving quality metric to the manual-driving quality metric below a predefined threshold.

11. The method according to claim 1, which comprises determining the autonomous-driving quality metric and the manual-driving quality metrics by the following steps:
   during operation of the autonomous vehicle, the driving speed of the autonomous vehicle is determined at random instants of time;
   the locations of the autonomous vehicle is determined for those time points where the speed is determined;
   the autonomous vehicle speed values are compared with a geostationary speed value associated to the respective locations;
   a speed difference between the driving speed and the geostationary speed value is determined; and
   a plurality of such resulting values are combined to the metric.

12. The method according to claim 1, which comprises determining the autonomous-driving quality metric and the manual-driving quality metrics by the following steps:
   during operation of the autonomous vehicle, a speedup acceleration of the autonomous vehicle is detected by an acceleration sensor in the autonomous vehicle;
   wherein a maximum speed, which occurs during or without deceleration after an acceleration event in which the autonomous vehicle acceleration is above a predetermined threshold, is stored as an acceleration event value;
   the acceleration event value is compared with a geostationary speed value of a location where the acceleration event value occurred; and
   a plurality of such resulting values are combined to the metric.

13. The method according to claim 1, which comprises determining the autonomous-driving quality metric and the manual-driving quality metrics by the following steps:
   during operation of the autonomous vehicle, a deceleration of the autonomous vehicle is detected by an acceleration sensor in the autonomous vehicle;
   wherein from a speed difference between the speed occurring at the beginning and the speed at the end of an acceleration event in which the autonomous vehicle deceleration is above a predetermined threshold a resulting value is determined; and
   a plurality of such resulting values are combined to the metric.

14. The method according to claim 1, which comprises determining the autonomous-driving quality metric and the manual-driving quality metrics by the following steps:
   during operation of the autonomous vehicle, a positive and negative acceleration of the autonomous vehicle, each above a predetermined threshold, are detected by an acceleration sensor in the autonomous vehicle;
   a time span between the positive and negative acceleration is stored as an erratic driving event value or resulting value, respectively; and
   a plurality of such resulting values are combined to the metric.

15. The method according to claim 1, which comprises determining a plurality of autonomous-driving quality metrics for different quantity categories, and associating each of the plurality of autonomous-driving quality metrics with a plurality of manual-driving quality metrics of the same category of different autonomous vehicles, and determining a respective autonomous-driving accident rate value for each metric category.

16. The method according to claim 15, which comprises determining an overall autonomous-driving accident rate value from a combination of the autonomous-driving accident rate values which are weighted according to respective driving distance in the combination.

17. The method according to claim 1, which comprises eliminating potential weaknesses in autonomous driving software of the autonomous vehicle, which are indicated by the autonomous-driving accident rate value, by reprogramming the autonomous driving software.

18. The method according to claim 1, which comprises: calculating an insurance risk for an insurance company, which insures vehicles, based on the autonomous-driving accident rate value.

19. The method according to claim 1, which comprises: continuously assessing and evaluating the autonomous vehicle in terms of driving safety.

20. The method according to claim 1, wherein a rating value which is determined from a comparison of the respective manual-driving quality metric with the manual-driving quality metrics of other autonomous vehicles is associated with each of the plurality of manual-driving quality metrics, and wherein the one or more restriction parameters includes the rating value.

21. A system for controlling an autonomous vehicle, the system comprising:
   a sensor system of the autonomous vehicle configured for monitoring a driving parameter during a driving period in which the autonomous vehicle is autonomously driven;
   a server configured to receive, from said sensor system, signals related to the driving parameter; and
   autonomous-driving control software of the autonomous vehicle;
   said server configured for determining, from the driving parameter, an autonomous driving quality metric that quantifies an autonomous-driving quality of the driving of the autonomous vehicle based on driving values;
   said server configured for accessing a manual-driving quality metrics database and said server configured for pre-selecting, according to one or more restriction parameters, a group of manual-driving quality metrics from a plurality of manual-driving quality metrics stored in the manual-driving quality metrics database, wherein the plurality of manual-driving quality metrics have been determined from the driving parameter during manual driving periods of different autonomous vehicles;
   said server configured for selecting metrics from the pre-selected group of manual-driving quality metrics that show a predetermined degree of statistical similarity with the determined autonomous-driving quality metric, wherein the predetermined degree of statistical similarity is tested by Null-Hypothesis;
   said server configured for determining an autonomous-driving accident rate value from accident rate values associated with the selected manual-driving quality metrics; and
   said autonomous-driving control software of the autonomous vehicle configured for being updated based on the determined autonomous-driving accident rate value and for the controlling the autonomous vehicle after being updated based on the determined autonomous-driving accident rate value.

* * * * *